(12) United States Patent
Liu

(10) Patent No.: US 11,721,030 B2
(45) Date of Patent: Aug. 8, 2023

(54) METHOD OF AUTONOMOUS HIERARCHICAL MULTI-DRONE IMAGE CAPTURING

(71) Applicants: Sony Group Corporation, Tokyo (JP); Sony Corporation of America, New York, NY (US)

(72) Inventor: Cheng-Yi Liu, San Jose, CA (US)

(73) Assignees: SONY GROUP CORPORATION, Tokyo (JP); SONY CORPORATION OF AMERICA, New York, NY (US)

( * ) Notice: Subject to any disclaimer, the term of this patent is extended or adjusted under 35 U.S.C. 154(b) by 224 days.

(21) Appl. No.: 17/344,664

(22) Filed: Jun. 10, 2021

(65) Prior Publication Data

US 2022/0398756 A1 Dec. 15, 2022

(51) Int. Cl.
| | | |
|---|---|---|
| *G06T 7/37* | (2017.01) | |
| *G06T 7/70* | (2017.01) | |
| *B64C 39/02* | (2023.01) | |
| *G01S 17/933* | (2020.01) | |
| *G05D 1/10* | (2006.01) | |

(Continued)

(52) U.S. Cl.
CPC .............. *G06T 7/37* (2017.01); *B64C 39/024* (2013.01); *G01S 17/933* (2013.01); *G05D 1/104* (2013.01); *G06T 7/70* (2017.01); *B64U 10/13* (2023.01); *B64U 2101/30* (2023.01); *G06T 2207/10032* (2013.01); *G06T 2207/20064* (2013.01); *G06T 2207/30241* (2013.01)

(58) Field of Classification Search
CPC ... G06T 7/37; G06T 7/70; G06T 2207/10032; G06T 2207/20064; G06T 2207/30241; B64C 39/024; G01S 17/933; G05D 1/104; B64U 10/13; B64U 2101/30; B64U 2201/102; H04N 23/661; H04N 23/695
USPC ........................................................ 382/284
See application file for complete search history.

(56) References Cited

U.S. PATENT DOCUMENTS

| | | | |
|---|---|---|---|
| 10,114,384 B2 | 10/2018 | Liu et al. | |
| 11,454,988 B2 * | 9/2022 | Blonder | ................. B64D 47/08 |
| 2017/0145183 A1 * | 5/2017 | Hebrink | ................. C08K 3/105 |

(Continued)

FOREIGN PATENT DOCUMENTS

| | | | | |
|---|---|---|---|---|
| CN | 109144110 A | | 1/2019 | |
| EP | 3835217 | * | 6/2021 | ................. B64F 3/00 |

(Continued)

*Primary Examiner* — Jerome Grant, II
(74) *Attorney, Agent, or Firm* — Trellis IP Law Group, PC

(57) ABSTRACT

A method for optimizing image capture of a scene by a swarm of drones including a root drone and first and second level-1 drones involves the root drone following a predetermined trajectory over the scene, capturing one or more root keyframe images, at a corresponding one or more root drone orientations and root drone-to-scene distances. For each root keyframe image: the root drone generates a ground mask image for that root keyframe image, and applies that ground mask image to the root keyframe image to generate a target image. The root drone then analyzes the target image to generate first and second scanning tasks for the first and second level-1 drones to capture a plurality of images of the scene at a level-1 drone-to-scene distance smaller than the root drone-to-scene distance; and the first and second level-1 drones carry out the first and second scanning tasks respectively.

20 Claims, 7 Drawing Sheets

(51) Int. Cl.
  *B64U 10/13* (2023.01)
  *B64U 101/30* (2023.01)

(56) References Cited

U.S. PATENT DOCUMENTS

2018/0259960 A1     9/2018  Cuban
2021/0295724 A1 *   9/2021  Shmueli ............... G05D 1/0206
2022/0398395 A1 *  12/2022  Liu ....................... B64C 39/024

FOREIGN PATENT DOCUMENTS

| FR | 3034681 | * | 10/2016 | ............. G01C 21/16 |
| FR | 3056921 | * | 4/2018 | ........... A63H 27/133 |
| JP | 2020023283 | | 2/2020 | |
| KR | 2020 0079180 A | | 7/2020 | |
| WO | WO2017145183 | * | 8/2017 | ............. G06Q 50/00 |
| WO | WO2020120601 | * | 6/2020 | ............... G05D 1/02 |

* cited by examiner

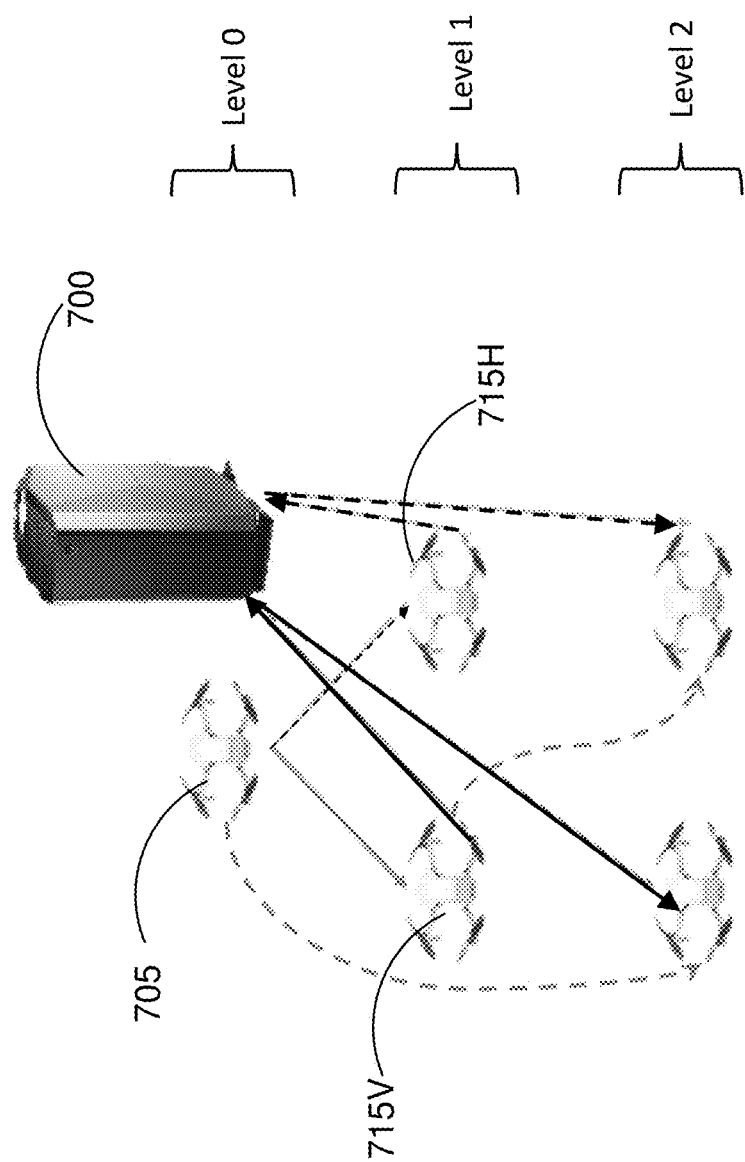

METHOD OF AUTONOMOUS HIERARCHICAL MULTI-DRONE IMAGE CAPTURING

CROSS REFERENCES TO RELATED APPLICATIONS

This application is related to the following applications, U.S. patent application Ser. No. 16/917,013, entitled SYSTEM OF MULTI-DRONE VISUAL CONTENT CAPTURING, filed on Jun. 30, 2020 (020699-116500US), which is hereby incorporated by reference as if set forth in full in this application for all purposes.

BACKGROUND

It has become established practice to use a swarm of drones, rather than just a single drone, to capture multiple image streams of a large-scale 3D target or scene, allowing a relatively efficient subsequent 2D or 3D reconstruction of the scene to be made. In some cases, the drones are flown in formation along suitable predetermined trajectories, to capture dense local multi-views of a target; in other cases, individual drones in the swarm may follow significantly different predetermined trajectories, capturing images at different perspectives for a global multi-view of that target. However, each of these approaches has problems in capturing high quality images of the target efficiently in terms of time and processing resources.

For a formatted swarm flight, precise swarm formation and coordinated trajectory planning is crucial, and complicated to achieve, especially if the trajectories must be adaptive to anticipated variations of the spatial density of features of interest in the scene. The time taken—before the images can actually be captured—just to prepare for the drone deployment is lengthy, and generally involves a lot of manual decision making.

As for the cases where drones fly along different trajectories rather than as a coherent swarm, the quality of scene or target reconstruction may be significantly limited by the fact that not every part of the target will be viewed by each of the drones, unless a complex feat of trajectory planning is performed, again consuming a lot of time and resources. Just as in formatted swarm cases, it may be necessary to adapt the trajectories according to variations of the spatial density of features of interest over the target, making the task of trajectory planning even more challenging and time-consuming.

In most cases, a preliminary survey flight is made to gather the data necessary to plan the formatted or unformatted drone trajectories, causing the total preparation time to even longer.

There is therefore a need for more time-efficient methods to plan and/or control drone trajectories in a multiple drone swarm, to achieve high quality image captures and scene reconstructions. It would be desirable for such methods to transfer as much decision making as possible to one or more of the drones, to be carried out automatically in real time, rather than to make manual decisions ahead of drone deployment, and deal with imperfect results later in post-processing.

SUMMARY

Embodiments generally relate to methods and systems for optimizing image capture of a scene by drones. In one embodiment, a method applied using a swarm of drones comprising a root drone and first and second level-1 drones comprises: the root drone following a predetermined trajectory over the scene, capturing one or more root keyframe images, at a corresponding one or more root drone orientations and a corresponding one or more root drone-to-scene distances; and for each root keyframe image: the root drone generating a ground mask image for that root keyframe image after that root keyframe image is captured, and applying that ground mask image to the root keyframe image to generate a target image; the root drone analyzing the target image to generate first and second scanning tasks for the first and second level-1 drones, wherein each scanning task comprises capturing a plurality of images of the static scene at a level-1 drone-to-scene distance smaller than the root drone-to-scene distance; and the first and second level-1 drones carrying out the first and second scanning tasks respectively.

In another embodiment, a system for optimizing image capture of a scene by a swarm of drones comprises: one or more processors in each drone in the swarm; and logic encoded in one or more non-transitory media for execution by the one or more processors. When the logic is executed, it is operable to: direct the root drone, while following a predetermined trajectory over the scene, to capture one or more root keyframe images, at a corresponding plurality of root drone orientations and a corresponding plurality of root drone-to-scene distances; and, for each root keyframe image: direct the root drone to generate a ground mask image for that root keyframe image after that root keyframe image is captured, and apply that ground mask image to the root keyframe image to generate a target image; direct the root drone to analyze the target image to generate first and second scanning tasks for the first and second level-1 drones, wherein each scanning task comprises capturing a plurality of images of the static scene at a level-1 drone-to-scene distance smaller than the corresponding root drone-to-scene distance; and direct the first and second level-1 drones to carry out the first and second scanning tasks respectively.

BRIEF DESCRIPTION OF THE DRAWINGS

FIG. 7 illustrates a hierarchical drone swarm with level switching according to some embodiments of the present invention.

DETAILED DESCRIPTION OF EMBODIMENTS

A further understanding of the nature and the advantages of particular embodiments disclosed herein may be realized by reference to the remaining portions of the specification and the attached drawings.

Figure 1:
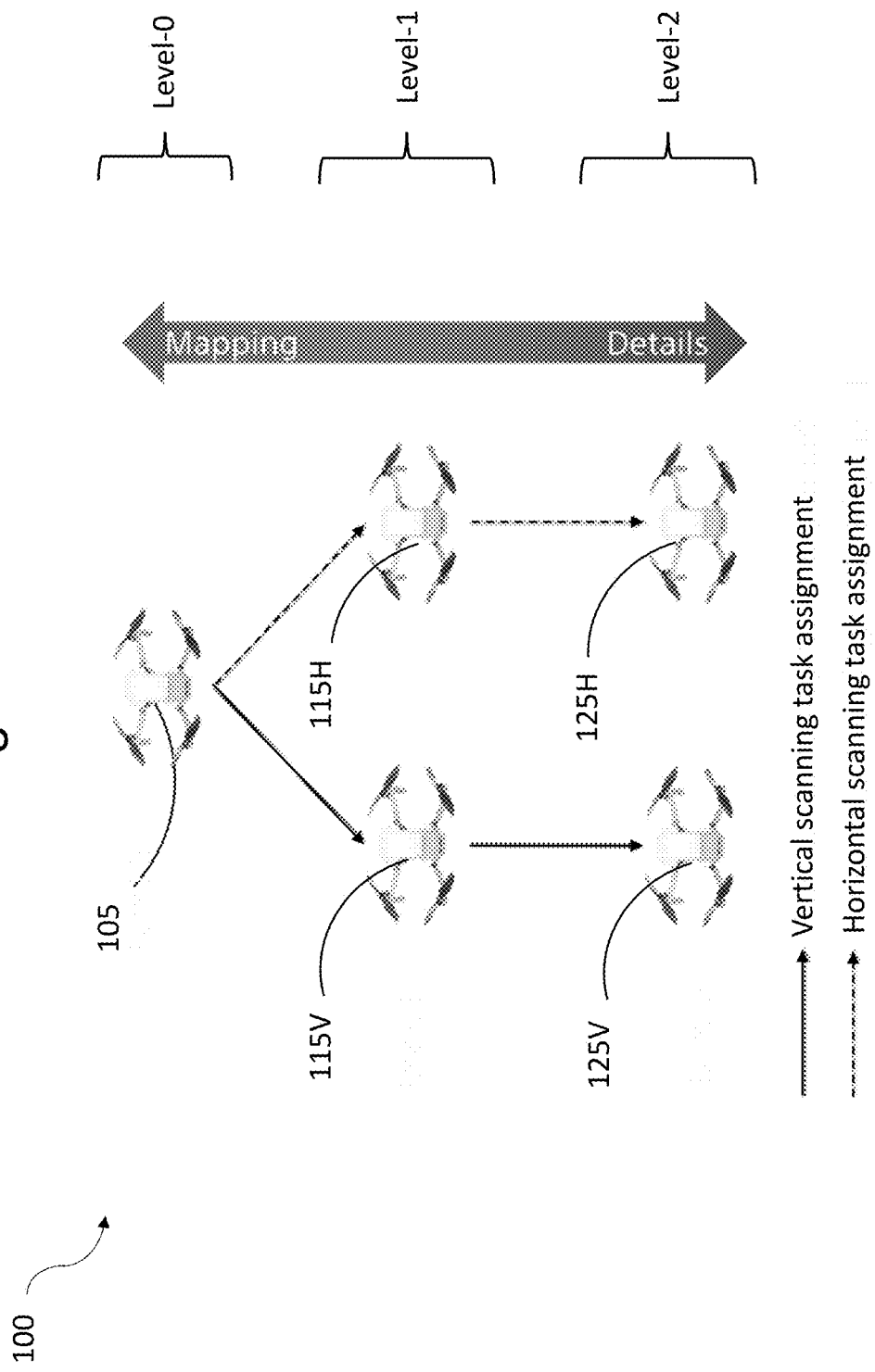
FIG. 1 illustrates a hierarchical drone swarm according to some embodiments of the present invention.

FIG. 1 illustrates one example of a hierarchical drone swarm 100 according to some embodiments of the present invention. The swarm in this case takes the form of a simple three level system, with one drone 105, hereafter referred to as the "root" drone of the swarm, at level-0 and a pair of drones at each of two subsequent higher levels, level-1 (see drones 115V, 115H) and level-2 (see drones 125V and 125H). The basis for the division into levels is the inventor's realization that great benefits might result by using a drone hierarchy, with one root drone at the top, following one trajectory over the entire scene, capturing images that provide a rough, global view, and then other drones lower in the hierarchy, flying at successively smaller distances from the scene than the root drone, to capture images at higher resolution not of the whole scene but parts of it that warrant the extra scrutiny, as determined by an analysis of images captured by that root drone. The details of how this may be achieved in practice will be discussed below, but the essence of the invention lies in this division of image capturing responsibilities between different drone levels, although the drones themselves may be identically equipped, and in certain embodiments (see FIG. 7) may even change positions within the hierarchy.

One important feature of the hierarchical organization of system 100 is that for any level L>0, the trajectory of each drone in level L is automatically determined by a "parent" drone in the level L-1. Thus, the level-1 drones, 115V and 115H, have their trajectories automatically determined by root drone 105, while the level-2 drones 125V and 125H have their own trajectories determined by their parent drones, 115V and 115H respectively.

Figure 2:
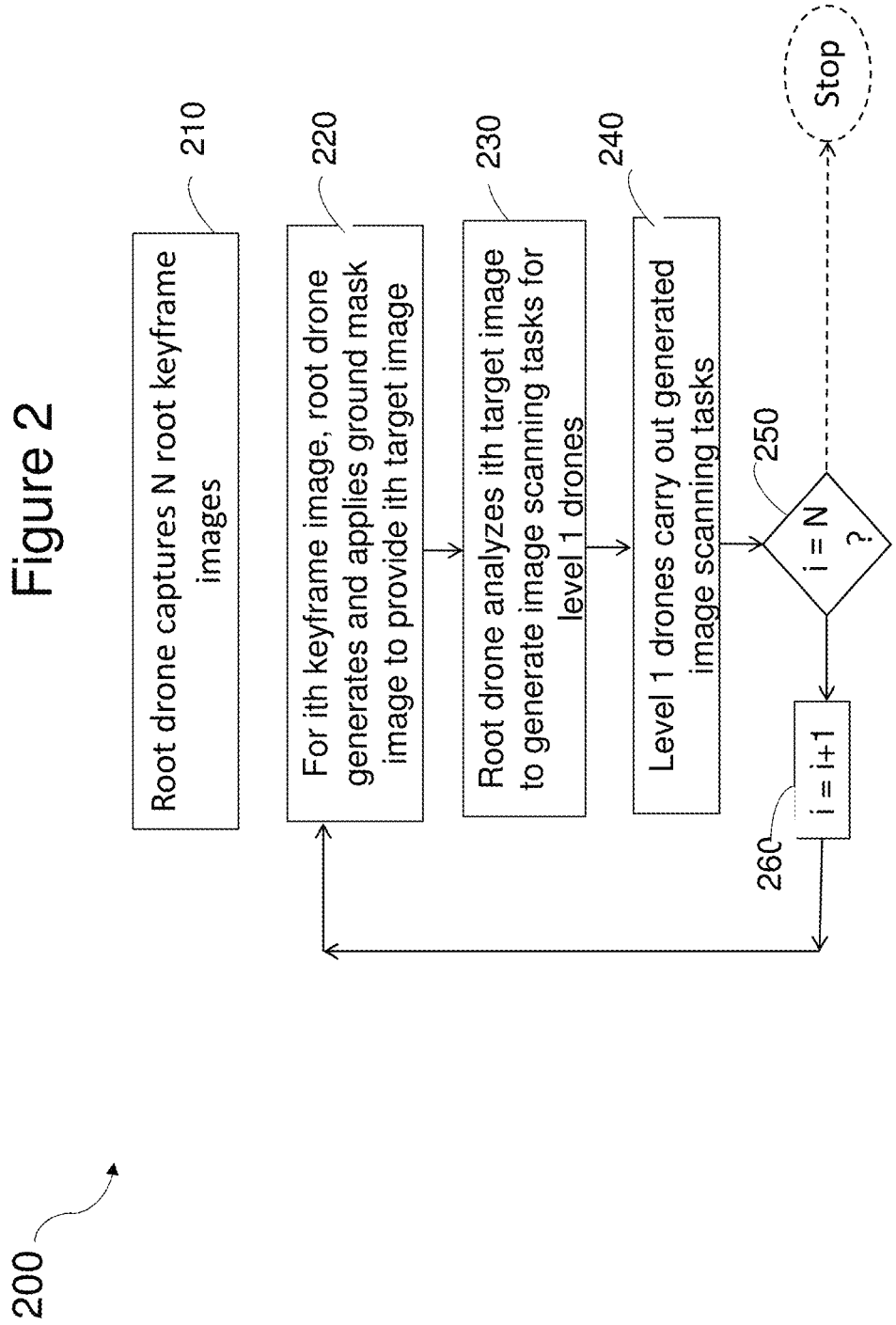
FIG. 2 illustrates effects of steps of a method according to embodiments of the present invention.

FIG. 2 is a flowchart of method 200 detailing how embodiments of the present invention may operate with a drone swarm similar to swarm 100, but in a very simple configuration, consisting of only two levels (level-0 and level-1).

Method 200 begins at step 210, with the root drone capturing one or more (N) root keyframe images. In the typical case where N>2, the root drone may capture other images between the keyframe images, the distinction simply being that a keyframe image may be taken as sufficiently representative of the scene for the processes to be described below to be usefully carried out and applied. For example, it may well be that the drone's image capture rate in relation to with its velocity results in every $10^{th}$ image captured having sufficient view overlap with the one 10 frames before and after for it to be unnecessary to carry out the processing on the batches of 9 images in between; in this scenario, the series of "$10^{th}$" images would be the keyframe images. Other methods more complicated than simply excluding a fixed number of images may be envisaged, such as a deliberate check for adequate image feature overlap.

Accurate positioning of the root drone (and camera positioning on the drone if the two are independently adjustable) requires the use of high-quality sensor systems, which typically means the drone uses an RTK-GPS+IMU receiver for global positioning and orientation, and one or more distance sensor such as LiDAR, for drone-to-ground and drone-to-target measurement. Additional sensors may also be used for higher positioning accuracy and better obstacle (including ground) avoidance.

As the root drone follows its predetermined trajectory over the scene, each keyframe image captured at step 210 will have been captured at a corresponding root drone orientation and drone-to-scene distance, $D_{root}$ say. The root drone has a means (such as LIDAR, as noted above) of keeping that distance large enough for the stream of images captured during the drone's flight to yield a global view of the entire scene, without that flight taking an unacceptably long time. Parameters of the drone camera in combination with the value of $D_{root}$ will determine the spatial resolution of each captured keyframe image i.e., the level of scene detail visible therein.

At step 220, for each keyframe image captured, the root drone generates and applies a ground mask image, to provide a corresponding target image. To create this mask, the root drone root may use one or more types of input information, such as knowledge of the scene available in advance of the root drone flight, knowledge of the height of the root drone above ground level while capturing the root keyframe image, and knowledge of the distance between the root drone and the target of interest in the scene, while capturing the root keyframe image.

The primary purpose of the ground mask image is to remove the area in the captured image representing a ground plane, so that the root drone can then generate scanning tasks for drones in other levels that will not involve flying dangerously close to the ground during their subsequent flights. One can also include other types of masks to exclude other areas that may be of little interest, like the sky, or views of distant hills. A secondary purpose may be to reduce the image area to be processed in the following trajectory planning step for computational efficiency.

Figure 3:
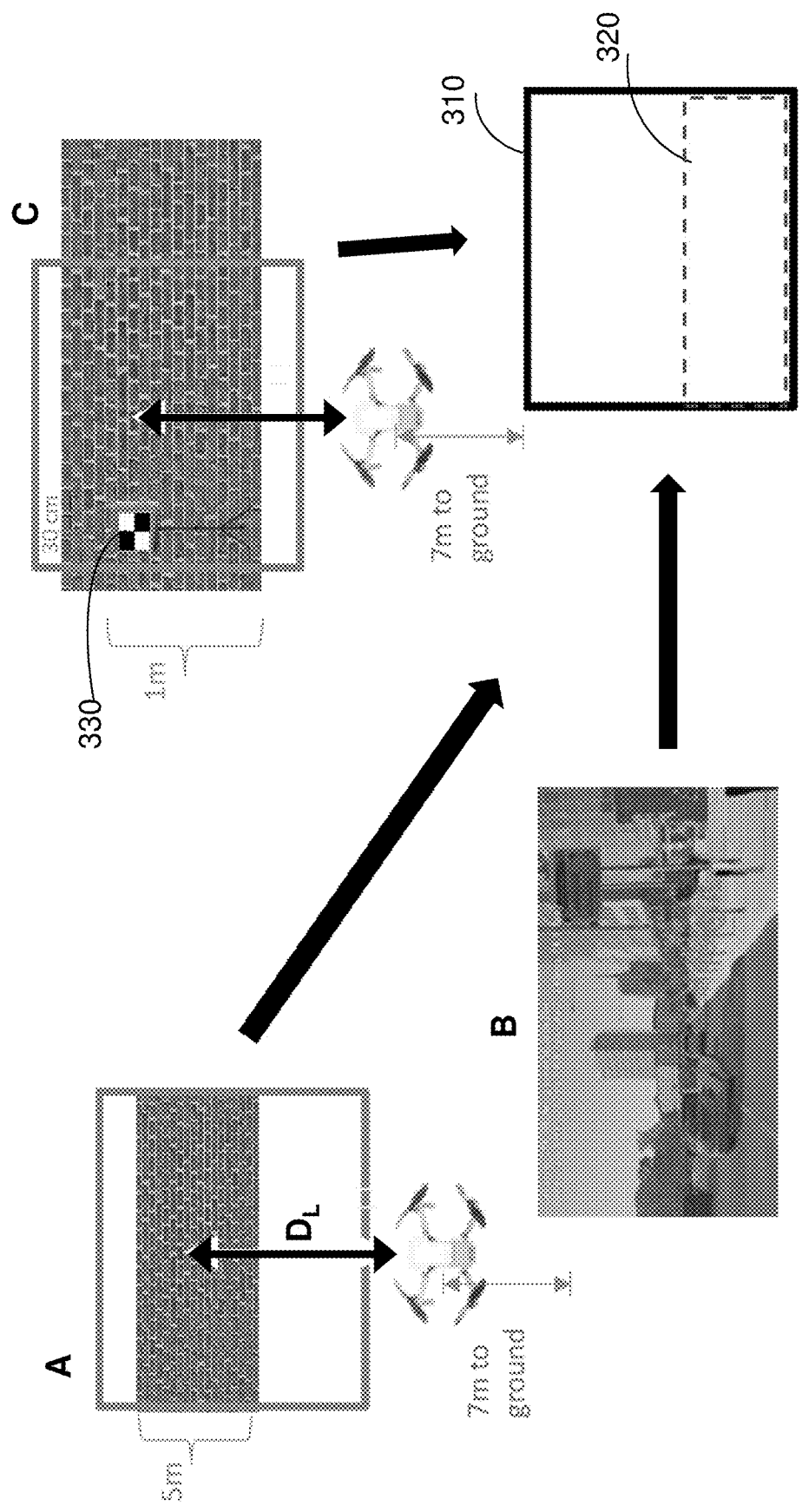
FIG. 3 illustrates different approaches to generating a root drone ground mask according to embodiments of the present invention.

FIG. 3 illustrates the mask generation process. The end result is ground mask 310, in the simplest case basically made up of two adjacent rectangles, one above the other, with the horizontal line of contact 320 corresponding to the estimated ground plane or horizon in the root keyframe image. In some cases, indicated by example A in the figure, where a horizontally flat ground plane is easily distinguished over the width of the root keyframe image, the task of locating the horizontal line of contact corresponding to the estimated ground plane in the image is relatively simple. In other cases, such as example B in the figure, a segmentation image analysis process may be required, possibly using a neural network, to identify objects naturally present in the scene, from which local ground position may be inferred. In yet other cases, such as example C in the figure, one or more reference height markers present in the scene and visible (see 330) in the captured keyframe image, may be used to infer local ground position.

In some cases, the generated ground mask image may include one or more indications of areas of interest based on reference markers present in the scene and visible in the captured keyframe image. In some cases, the generated ground mask image may include one or more bounded segments defining image contents of interest based on an image segmentation method applied to the root keyframe image.

Returning to FIG. 2, at step 230 the root drone carries out an analysis of the target image—the image resulting from the masking of the captured image by the ground mask image—to identify one or more regions within the target image that deserve closer scrutiny, by virtue of containing surface features of interest, at relatively high spatial density. In other words, the relatively crude imaging provided by the root drone may be sufficient for some other regions of the target image, but the root drone determines that higher resolution images of the identified regions should be captured by drones at the next (L=1) level, which will be instructed to fly closer to the scene than the root drone, and to focus their attention on those identified regions.

Figure 4:
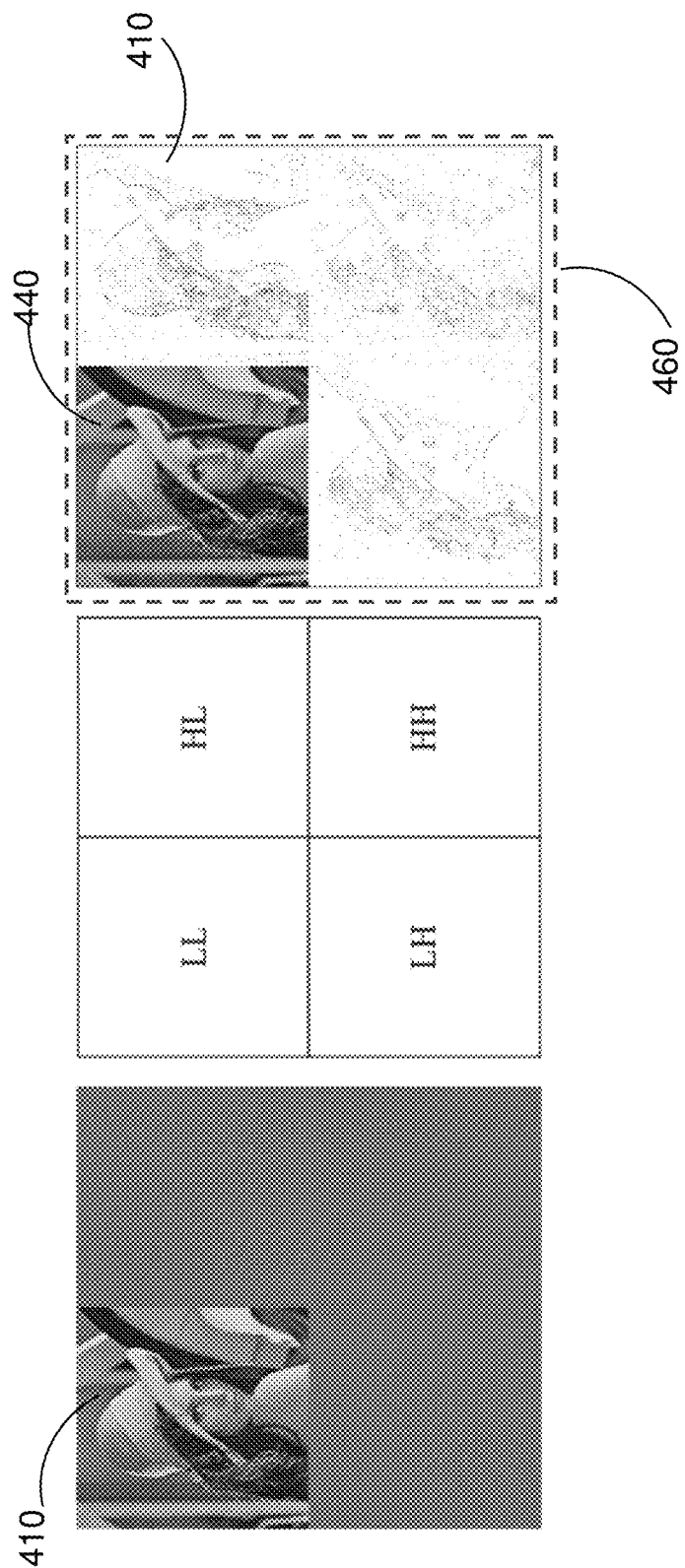
FIG. 4 illustrates the application of wavelet transform methods to generate response images according to embodiments of the present invention.

FIG. 4 illustrates how the root drone can apply a wavelet transform process on the target image, as a first step in the generation of scanning tasks for the level-1 drones. The level-1 drones can use essentially the same process on the keyframe images they later capture, as a first step in the generation of scanning tasks for the level-2 drones, and so on. Consider the case of exemplary image 410, whose contents originally occupied the entire area shown in grey on left of the figure, but which has been reduced to a quarter of its original size, such that pairs of adjacent pixels in rows of the original are combined into single pixels in one (horizontal) direction, and pairs of adjacent pixels in columns of the original are combined into single pixels in the other (vertical) direction. The mathematics of wavelet transforms are well known in the art and will not be discussed herein, but it should be appreciated that performing such transforms on pixels in image 410 will yield a series of wavelet coefficients along the horizontal direction for each row and another series along the vertical direction for each column, and that the absolute values of these coefficients can be determined to be either high (H) or low (L) relative to some predetermined threshold.

A set 430 of four frequency blocks LL, LH, HL, and HH can thus be created, representing image 410 in four different ways, pixel by pixel, according to whether the wavelet coefficients for that pixel are high or low, with the first letter relating to the horizontal direction and the second letter to the vertical direction. So, for example, the version of the image in the upper right quadrant 440 on the right of the figure, labeled HL, distinguishes only those pixels whose wavelet coefficients along the horizontal direction are high and whose wavelet coefficients along the vertical direction are low. Similarly, the upper left quadrant (LL) indicates pixels whose coefficients along both directions are low, the lower right quadrant (HH) indicates pixels whose coefficients along both directions are high, and the lower left quadrant LH) indicates pixels whose wavelet coefficients along the horizontal direction are low but whose wavelet coefficients along the vertical direction are high. The complete set 460 of output images are termed horizontal and vertical response images. They clearly show which regions in the original image have a high information density in terms of edges or contrasting surface textures along the horizontal and/or vertical directions.

It is then a relatively straightforward matter for the root drone to automatically determine regions of interest on the basis of spatial density of interest points in the response images, and thus to calculate trajectories for the level-1 drones to follow so that they in turn can capture additional images of those points. Various window-based methods using rectangular or Parzen windows, for example, are well known ways to estimate local interest point density. It may be noted that the 2×2 pixel reduction of image 410 provides a simply calculated mapping back to pixel coordinates of the original image, and in turn to real world drone position coordinates.

One of the level-1 drones will typically be assigned to follow a horizontal path and another to follow a vertical path (in the sense of the rows and columns of the target image, of course, not in a global sense), with each path designed to position that level-1 drone so that images captured will cover the regions of interest, with the drone positioned closer to the scene than the root drone was, so that finer visual details will be apparent in the images captured relative to those in the root drone's keyframe image. The orientation of the level-1 drones will in general be constrained to match the orientation of the root drone, although in some cases, to be described below, a relative tilt or yaw may be imposed to achieve a particular objective. The combination of instructions from the root drone to a level-1 drone is termed a scanning task.

Figure 5:
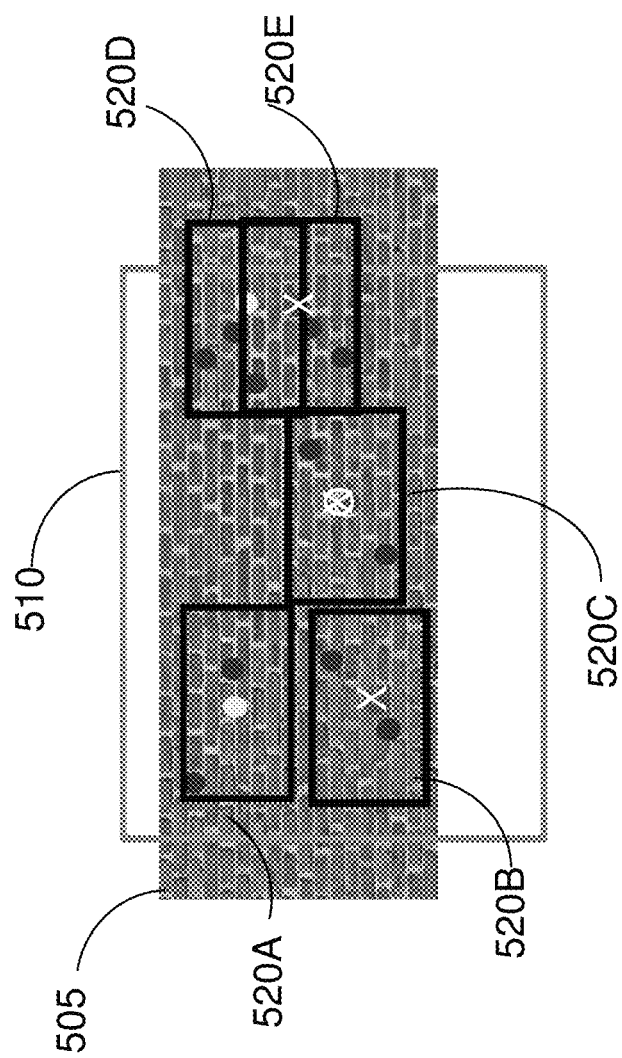
FIG. 5 illustrates a window-based method of generating scan tasks according to some embodiments of the present invention.

Many different methods may be envisaged to generate the details of scanning tasks to efficiently capture high resolution images of the regions of greater interest without wasting time on other regions adequately covered by the root drone keyframe image. Ideally this is achieved largely by positioning the higher-level drones closer to the target, without having to resort to zoom as opposed to fixed focus photography, thus avoiding the image distortions inherent in the former. FIG. 5 illustrates part of one such method, applied to the generation of a vertical scanning task. Rectangular region 510 represents the region of scene 505 covered by the root keyframe image. Smaller rectangles (520A-520E) represent the coverage of images to be captured by one of the level-1 drones (the vertical drone) to cover the local regions with many points of interest. The level-1 drones may be termed "child" drones relative to the "parent" root drone.

In the illustrated example, the child image rectangles are arranged in contiguous columns, such that all interest points (the dark circles) are addressed. The centers of the rectangles (circles for the top rectangle in a column, crosses for the bottom rectangle in a column) define the start and end points of the vertical drone for each column, and a raster-type scan path to cover all the rectangles can thus be defined. In the simple case illustrated, the scan task will ensure that at least five child images will be captured with a child drone orientation matching that of the root drone camera when it captured the keyframe image, one child image for each of the regions 520A-520E, and each showing greater detail than that of the parent keyframe image. The scan task may direct the child drone to follow a path down from capturing an image at 520A to capturing one at 520B, then move to the right and then up to just capture an image at 520C (as that would cover all the points of interest in this one-rectangle column), and then move to the right again and then down from capturing an image at 520D to capture a last image at 520E.

Different methods of positioning child image rectangles and calculating scan paths may follow slightly different rules regarding the positioning of rectangle edges relative to points of interest, what type of overlap between rectangles within or across columns may be permitted, and so on, in the interests of optimizing computation speed, image capturing efficiency, or some combination of the two.

Figure 6:
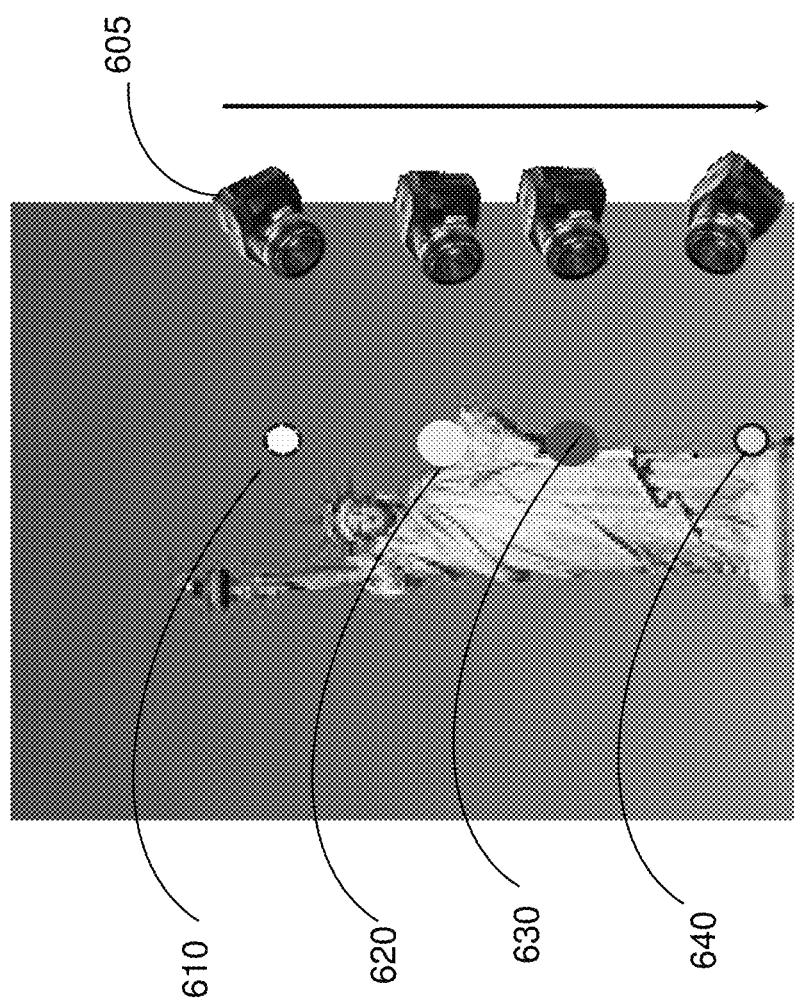
FIG. 6 illustrates the significance of augmented scan points in some embodiments of the present invention.

In some cases—see FIG. 6—it may be advantageous to augment the coverage by capturing additional images at tilted orientations. Typically, this would include at least an extra pair of images, one captured from a drone position corresponding to a few pixels higher than the center of the top rectangle, but angled to view the same region of the scene from a tilted down perspective, and a second captured from a drone position corresponding to a few pixels lower than the center of the bottom rectangle, but angled to view the same region of the scene from a tilted up perspective. The scan trajectory planned by the root drone for the level-1 drone responsible for vertical scanning will be correspondingly extended slightly at both ends of each linear up or down portion of the raster.

FIG. 6 shows part of a scene that has been determined to be of interest, with the center points of two child rectangles marked as circles 620 and 630 (the rectangles themselves are not shown, for simplicity). The planned trajectory of child drone 605 would therefore include a vertical path allowing it to capture images centered at each of those circles. In addition, scan "augmented" positions 610 and 640 are also marked, showing that child drone 605 should be positioned to capture images from positions slightly above and below the positions required to capture the "normal" images, and to incorporate positive and negative tilts. If the drone travels down in the direction indicated by the arrow, its positions and orientations corresponding to the four required images might appear as schematically indicated on the right of the figure. Notice that for the central two positions, the drone orientation is the same as that of the root drone that captured the original keyframe image.

FIGS. 5 and 6, and the related discussion above, have been directed towards scanning task generation for the vertical drone. Essentially the same issues arise for the level-1 drone assigned to capture images while moving horizontally rather than vertically, capturing images of regions of the scene with a high density of interest points as established from the corresponding "horizontal" wavelet coefficients. Of course, these regions will not necessarily coincide with the regions of interest established from the corresponding "vertical" wavelet coefficients. The methods described above for the vertical drone may be applied for the horizontal drone, with rectangular areas to be imaged arranged in rows, rather than columns, and horizontal rather than vertical paths calculated. In cases where augmented scan positions are desired, the shifted angular orientations would be expressed in terms of yaw rather than tilt.

Returning to FIG. 2, at step 240 of method 200, the level-1 drones carry out their assigned scan tasks, following the trajectories planned by the root drone, and capturing images at the positions and orientations set by the root drone. The same types of positioning and distance measuring sensor systems discussed above with respect to the root drone are appropriately used for these drones too.

While most of the discussion above has related to a 2-level system (root drone in level-0 and two drones in level-1, methods and systems that extend the present invention to encompass additional drone levels may easily be envisaged. For example, consider the 3-level system shown in FIG. 1, which includes a pair of drones in level-2, such that each of the level-1 drones acts as a parent drone to a corresponding child drone in level-2. Consider drones 115V and 125V, for example. Parent drone 115V would carry out the scan task set for it by root drone 105 and designate one or more of the captured images as level-1 keyframe images. The ground mask generated by the root drone may be upscaled to generate a level-1 target image from that level-1 keyframe image. Optionally, ground segmentation using a deep neural network may be performed at any of the child drone level to further refine the mask.

For each level-1 target image, wavelet analysis is carried out to yield vertical response images, from which columns of rectangular regions arranged in columns can be defined and a vertical scan task determined for child drone 125V, using the same techniques described above in the case of root drone 105 determining a vertical scan task for 115V. Drones 115H and 125H will fulfill corresponding roles for horizontal scan tasks.

Each path designed for a level-2 drone will be determined by the parent level-1 drone so that images captured will cover the regions of interest, with the level-2 drone positioned closer to the scene than the corresponding level-1 drone was, so that even finer visual details will be apparent in the images captured relative to those in the level-1 drone's keyframe image. As before, the orientation of the level-2 drones will in general be constrained to match the orientation of the parent level-1 drones, with possible exceptions where tilt or yaw is applied for a new set of augmented scan points.

Typically, each drone in a swarm of drones in systems of the present invention will tag each image captured by that drone with corresponding pose data in global coordinates.

FIG. 7 illustrates one embodiment of the present invention that caters for the situation where there are too few drones available to be able to assign each one to a single role (defined by a single level) for the whole image capturing process. In the illustrated case, a root drone (705) sends its scan task instructions to level-1 drones (715V and 715H) as before. Each level-1 drone (715V, 715H) follows those instructions, analyses its own keyframe image, but sends new scan task instructions to a central station 700, as no child drones are immediately available in level 3. However, root drone 705 then switches levels to take up a role as a child drone in level-2, in effect following the lighter dashed path on the left of the figure, and level-1 drone 715V also switches levels to take up the other "vacant" child drone in level-2, following the curved dash path through the center of the figure. Central station 700 forwards the corresponding scan tasks to the newly instated child drone in level-2, and the tasks generated at level-1 are completed. In this way, all the generated scan tasks may be completed as desired, using just 3 physical drones rather than 5 in the illustrated case.

In any of the embodiments described above, after drones at the highest level of the swarm in question have completed capturing their images, the process of image selection and alignment for a 2D or 3D reconstruction of the scene can be carried out.

In the selection of a subset of images, priority is given according to level, such that for a given target area, images captured by drones in level L are favored over images captured by drones in level L-1, and so on, with the relatively coarse images provided by the root level drone having the lowest priority of all. This "bottom-up" rule (so-called because it begins with images captured by the drones at the bottom of the hierarchy) is aimed at retaining the fine details captured by a higher-level drone image for each area of high interest, only using coarser detail images from a lower level drone for regions of relatively low interest.

The images in the selected subset are then aligned according to a "top-down" rule, beginning with prioritizing the root drone images at the top of the hierarchy, which offer the broadest coverage, and continuing down through successive levels to fill in the details over the areas of particular interest placed correctly in the context of the whole scene.

Embodiments of the present invention provide many benefits. In particular, they allow for the use of a multi-drone swarm in a hierarchical configuration in which decisions made on the basis of images captured by a root drone determine trajectory and image capturing tasks for the next level of drones, and the process is repeated through successive levels of drones in the swarm, essentially adapting those tasks to optimize image capture over surfaces of greatest interest. Decisions on drone poses (positions and orientations) are made actively, saving time both in advance and in post processing of the images. The camera trajectory plans of all levels in the present invention are traceable, so one can reinstate a new level L+1 tasks from the current level L at any time in the future.

The present invention offers great flexibility in terms of the number of drones, beyond the inclusion of different numbers of levels. With the inclusion of a central station such as 700 in FIG. 7, the invention can be implemented with just one single drone, or with even more drones per child level, by further splitting the vertical and horizontal tasks of a level between three or more drones.

Although the description has been described with respect to particular embodiments thereof, these particular embodiments are merely illustrative, and not restrictive.

Any suitable programming language can be used to implement the routines of particular embodiments including C, C++, Java, assembly language, Python, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general-purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. Examples of processing systems can include servers, clients, end user devices, routers, switches, networked storage, etc. A computer may be any processor in communication with a memory. The memory may be any suitable processor-readable storage medium, such as random-access memory (RAM), read-only memory (ROM), magnetic or optical disk, or other non-transitory media suitable for storing instructions for execution by the processor.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

I claim:

1. A method for optimizing image capture of a scene by a swarm of drones comprising a root drone and first and second level-1 drones; the method comprising:
    the root drone following a predetermined trajectory over the scene, capturing one or more root keyframe images, at a corresponding one or more root drone orientations and a corresponding one or more root drone-to-scene distances; and
    for each root keyframe image:
        the root drone generating a ground mask image for that root keyframe image after that root keyframe image is captured, and applying that ground mask image to the root keyframe image to generate a target image;
        the root drone analyzing the target image to generate first and second scanning tasks for the first and second level-1 drones, wherein each scanning task comprises capturing a plurality of images of the scene at a level-1 drone-to-scene distance smaller than the root drone-to-scene distance; and
        the first and second level-1 drones carrying out the first and second scanning tasks respectively.

2. The method of claim 1, wherein analyzing the target image comprises:
    using a wavelet transform process to generate horizontal and vertical response images;
    analyzing the horizontal and vertical response images to determine interest points; and
    analyzing a spatial density of the interest points to generate the first and second scanning tasks.

3. The method of claim 2,
    wherein the first scanning task requires the first level-1 drone to follow a horizontal path while capturing a first plurality of level-1 images; and
    wherein the second scanning task requires the second level-1 drone to follow a vertical path while capturing a second plurality of level-1 images.

4. The method of claim 3,
    wherein the first plurality of level-1 images includes one or more type-H1 images, showing one or more interest points visible to the first level-1 drone, while the first level-1 drone is at an orientation matching the root drone orientation; and
    wherein the second plurality of level-1 images includes one or more type-V1 images, showing one or more interest points visible to the second level-1 drone, while the second level-1 drone is at an orientation matching the root drone orientation.

5. The method of claim 4,
    wherein the first plurality of level-1 images further includes one or more type-H2 images, showing one or more interest points visible to the first level-1 drone, while the first level-1 drone is at an orientation having a difference in yaw relative to the root drone orientation; and
    wherein the second plurality of level-1 images further includes one or more type-V2 images, showing one or more interest points visible to the second level-1 drone, while the second level-1 drone is at an orientation having a difference in tilt relative to the root drone orientation.

6. The method of claim 1,
wherein generating a ground mask image for a root keyframe image comprises processing inputs including:
prior knowledge of the scene;
a measured height of the root drone above ground level while capturing the root keyframe image; and
a measured root drone-to-scene distance while capturing the root keyframe image.

7. The method of claim 1,
wherein the root drone follows the predetermined trajectory over a first time interval; and
wherein the first and second level-1 drones carry out the first and second scanning tasks over second and third time intervals respectively, beginning after the first time interval is complete.

8. The method of claim 1, further comprising:
selecting a subset of images captured by the root drone and the level-1 drones, and
aligning images in the selected subset to reconstruct the scene;
wherein the selecting follows a bottom-up rule, such that images captured by the level-1 drones are given higher priority than images captured by the root drone; and
wherein the aligning follows a top-down rule, such that images captured by the root drone are given higher priority than images captured by the level-1 drones.

9. The method of claim 1,
wherein the swarm of drones further comprises third and fourth level-2 drones;
wherein at least one of the first and second level-1 drones captures one or more level-1 keyframe images at a corresponding one or more level-1 drone-to-scene distances;
the method further comprising:
for each level-1 keyframe image:
the level-1 drone capturing the level-1 keyframe image analyzing a ground masked version of that keyframe image to generate third and fourth scanning tasks for the third and fourth level-2 drones, wherein each of the third and fourth scanning tasks comprises capturing a plurality of level-2 images of the scene at an orientation matching the orientation of the root drone and at a level-2 drone-to-scene distance smaller than the corresponding level-1 drone-to-scene distance; and
the third and fourth level-2 drones carrying out the third and fourth scanning tasks.

10. The method of claim 9, wherein analyzing the ground masked version of the keyframe image captured by the level-1 drone comprises:
using a wavelet transform process to generate level-1 horizontal and vertical response images;
analyzing the level-1 horizontal and vertical response images to determine level-1 interest points; and
analyzing a spatial density of the level-1 interest points to generate the third and fourth scanning tasks.

11. The method of claim 10,
wherein the third scanning task requires the third level-2 drone to follow a horizontal path while capturing a first plurality of level-2 images; and
wherein the fourth scanning task requires the fourth level-2 drone to follow a vertical path while capturing a second plurality of level-2 images.

12. The method of claim 9, further comprising:
selecting a subset of images captured by the root drone, the level-1 drones, and the level-2 drones; and
aligning images in the selected subset to reconstruct the scene;
wherein the selecting follows a bottom-up rule, such that images captured by the level-2 drones are given higher priority than images captured by the level-1 drones, and images captured by level-1 drones are given higher priority than images captured by the root drone; and
wherein the aligning follows a top-down rule, such that images captured by the root drone are given higher priority than images captured by the level-1 drones, and images captured by the level-1 drones are given higher priority than images captured by the level-2 drones.

13. A system for optimizing image capture of a scene by a swarm of drones comprising a root drone and first and second level-1 drones; the system comprising:
one or more processors in each drone in the swarm; and
logic encoded in one or more non-transitory media for execution by the one or more processors and when executed operable to:
direct the root drone, while following a predetermined trajectory over the scene, to capture one or more root keyframe images, at a corresponding plurality of root drone orientations and a corresponding plurality of root drone-to-scene distances; and
for each root keyframe image:
direct the root drone to generate a ground mask image for that root keyframe image after that root keyframe image is captured, and apply that ground mask image to the root keyframe image to generate a target image;
direct the root drone to analyze the target image to generate first and second scanning tasks for the first and second level-1 drones, wherein each scanning task comprises capturing a plurality of images of the scene at a level-1 drone-to-scene distance smaller than the corresponding root drone-to-scene distance; and
direct the first and second level-1 drones to carry out the first and second scanning tasks respectively.

14. The system of claim 13,
wherein each drone in the swarm of drones comprises GPS instrumentation for determination of drone position, IMU or a similar subsystem for a determination of drone orientation, a sensing subsystem coupled to a position adjustment system for avoiding obstacles and maintaining drone-to-scene distance and drone-to-ground height within desired ranges; and
wherein each drone in the swarm of drones tags each image captured by that drone with corresponding pose data in global coordinates.

15. The system of claim 14,
wherein the sensing subsystem comprises LiDAR.

16. The system of claim 13,
wherein the generated ground mask image comprises a horizontal line at an estimated horizon in the root keyframe image such that all image contents below the horizontal line are assumed to represent ground.

17. The system of claim 13,
wherein the generated ground mask image comprises one or more bounded segments defining image contents of interest based on an image segmentation method applied to the root keyframe image.

18. The system of claim 13,
wherein the generated ground mask image comprises one or more indications of areas of interest based on reference markers present in the scene and visible in the captured keyframe image.

19. The system of claim 13,
wherein the generation of a ground mask image makes use of a marker distinguishable in the captured keyframe image as providing a height-above-ground reference.

20. The system of claim 13,
wherein the swarm of drones further comprises third and fourth level-2 drones; and
wherein the logic when executed is further operable to:
  direct at least one of the first and second level-1 drones to capture one or more level-1 keyframe images, such that, for each level-1 keyframe image:
    the directed level-1 drone captures the level-1 keyframe image analyzing a ground masked version of that keyframe image to generate third and fourth scanning tasks for the third and fourth level-2 drones,
  wherein each of the third and fourth scanning tasks comprises capturing a plurality of level-2 images of the scene at an orientation matching the orientation of the root drone and at a level-2 drone-to-scene distance smaller than the corresponding level-1 drone-to-scene distance; and
    wherein the two or more level-2 drones are directed to carry out the third and fourth scanning tasks.

\* \* \* \* \*